US012374242B2

(12) United States Patent
Wieckowski et al.

(10) Patent No.: US 12,374,242 B2
(45) Date of Patent: Jul. 29, 2025

(54) ILLUMINATED DISPLAY WITH PRINTED GRAPHIC LAYER

(71) Applicant: LUMIQ Inc., Charleston, SC (US)

(72) Inventors: Michael J. Wieckowski, Charleston, SC (US); Kevin James Hammer, Charleston, SC (US); Andrew Casperson, Charleston, SC (US)

(73) Assignee: LUMIQ Inc., Charleston, SC (US)

( * ) Notice: Subject to any disclaimer, the term of this patent is extended or adjusted under 35 U.S.C. 154(b) by 91 days.

(21) Appl. No.: 18/143,717

(22) Filed: May 5, 2023

(65) Prior Publication Data

US 2024/0371301 A1 Nov. 7, 2024

(51) Int. Cl.

| | |
|---|---|
| ***G09F 13/08*** | (2006.01) |
| ***F21V 19/00*** | (2006.01) |
| ***G09F 13/00*** | (2006.01) |
| ***G09F 13/04*** | (2006.01) |
| *F21Y 113/17* | (2016.01) |
| *F21Y 115/10* | (2016.01) |

(52) U.S. Cl.

CPC ........ *G09F 13/005* (2013.01); *F21V 19/0015* (2013.01); *G09F 13/0413* (2013.01); *G09F 13/08* (2013.01); *F21Y 2113/17* (2016.08); *F21Y 2115/10* (2016.08)

(58) Field of Classification Search

CPC ........ G09F 13/08; G09F 13/06; G09F 13/005; G09F 13/04; G09F 9/33; G09F 13/0409; G09F 13/0413

See application file for complete search history.

(56) References Cited

U.S. PATENT DOCUMENTS 1,820,086 A * 8/1931 Naylor .................... G09F 13/00 40/550
3,381,401 A * 5/1968 Fuller, Jr. ................ G09F 13/08 40/776

(Continued)

FOREIGN PATENT DOCUMENTS

EP 1708082 A1 10/2006
FR 2254258 A5 7/1975

(Continued)

OTHER PUBLICATIONS

Examination Report for Canadian Application No. 3,200,446 dated Apr. 23, 2025. 4 pgs.

*Primary Examiner* — Ismael Negron
(74) *Attorney, Agent, or Firm* — Lerner David LLP

(57) ABSTRACT

A display includes a graphic layer having indicia. A opaque mask layer beneath the graphic layer has light-transmissive areas in registration with selected indicia on the graphic layer. A circuit panel bears light emitters. A spacer layer having openings therein is disposed between the mask layer and the circuit panel, and each light emitter is disposed in an opening of the spacer layer, so that light from each emitter can reach a light-transmissive area of the mask layer overlying the opening housing that light emitter. A control circuit selectively illuminates the light emitters so as to selectively illuminate indicia on the graphic layer through the light-transmissive areas. The light emitters need not be precisely aligned with the indicia on the graphic layer, such that numerous different displays can be made using identical circuit panels.

19 Claims, 6 Drawing Sheets

(56) References Cited

U.S. PATENT DOCUMENTS

| | | | | | |
|---|---|---|---|---|---|
| 4,254,453 | A * | 3/1981 | Mouyard | G09F 13/22 | 345/82 |
| 5,800,909 | A * | 9/1998 | Nitta | G09F 13/04 | 428/323 |
| 5,819,454 | A * | 10/1998 | Rosenitsch | G09F 9/33 | 40/550 |
| 6,810,612 | B2 * | 11/2004 | Huang | G09F 9/33 | 40/452 |
| 9,542,869 | B2 * | 1/2017 | Chang | G09F 13/08 | |
| 9,731,840 | B2 * | 8/2017 | Schoen | G09F 9/33 | |
| 11,760,253 | B2 * | 9/2023 | Muegge | F21S 43/50 | 362/517 |
| 11,837,111 | B1 * | 12/2023 | Borell | G09F 13/04 | |
| 2011/0157186 | A1 | 6/2011 | Funk et al. | | |
| 2015/0234727 | A1 * | 8/2015 | Rubadue | G09F 13/08 | 340/540 |
| 2015/0364066 | A1 * | 12/2015 | Djafer | G09F 13/04 | 40/559 |
| 2017/0249878 | A1 * | 8/2017 | Frey | G09F 9/33 | |
| 2021/0252828 | A1 | 8/2021 | Eitel et al. | | |
| 2021/0319711 | A1 | 10/2021 | Shilo | | |

FOREIGN PATENT DOCUMENTS

| | | | |
|---|---|---|---|
| GB | 2201023 | A | 8/1988 |
| GB | 2548134 | A | 9/2017 |
| WO | 2022094639 | A1 | 5/2022 |

* cited by examiner

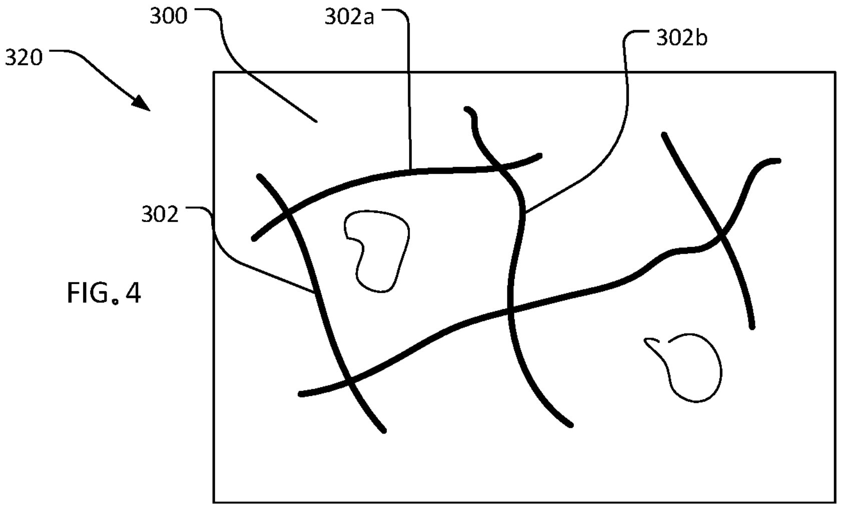
FIG. 4
FIG. 5
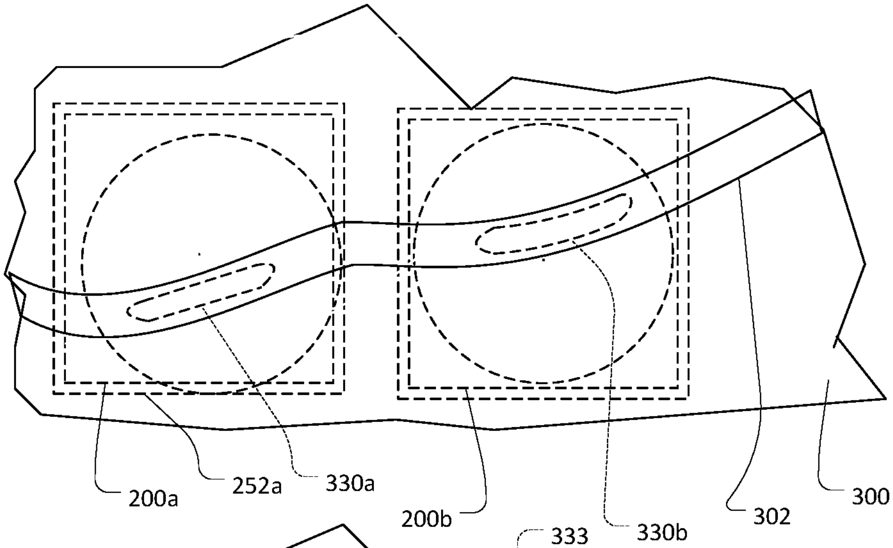
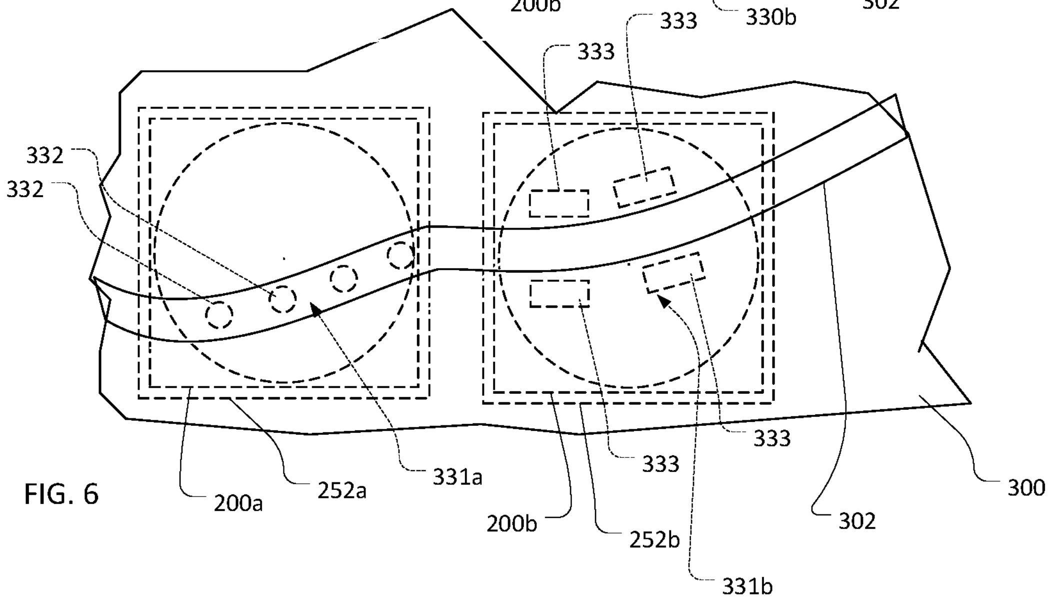
FIG. 6

ILLUMINATED DISPLAY WITH PRINTED GRAPHIC LAYER

BACKGROUND OF THE INVENTION

The present disclosure relates to displays which include a graphic element such as a map with selective illumination of indicia on the graphic. The graphic element typically includes fixed indicia which convey information that is expected to remain unchanged during the life of the display as, for example, the locations of highways or airports. These indicia can be selectively illuminated to convey variable information which changes during the life of the display. For example, fixed indicia depicting airport locations on an aviation chart can be illuminated in different colors to indicate weather conditions prevailing at each airport as, for example green for weather which permits visual flight rules ("VFR") operations and red for weather which requires instrument flight rules ("IFR") procedures. While the same combination of fixed indicia with selectively actuated indicia can be displayed using a video screen, many people prefer displays using a graphic element such as a printed map to show the fixed information.

Many displays have been made with a graphic element having fixed indicia and holes at indicia to be illuminated. These displays have light-emitting elements protruding through the holes or visible in the holes. This approach detracts from the aesthetic appeal of the display because the light emitting elements are visible even when they are not active. As described in WO2022094639; FR2254258 and GB2201023A, other displays have been made with a graphic element in the form of a translucent graphic layer with the fixed indicia thereon, and with light emitting elements mounted behind the graphic layer. Each light emitting element is arranged to emit a beam of light through a particular symbol on the graphic layer. With this approach, the light emitting elements cannot be seen when they are inactive. However, these are displays difficult and expensive to make, because they require precise alignment of each light emitting element with a corresponding symbol on the graphic layer. It is particularly difficult and expensive to achieve such alignment when fabricating many different displays with different graphic layers customized to the needs of different users. Moreover, all of the displays discussed above are thick, typically about 5 cm (2 inches) or more from the front of the graphic layer to the back of the display. When mounted on a wall, the display looks like a box with a graphic work on its front surface, rather than a graphic element mounted on the wall.

BRIEF SUMMARY OF THE INVENTION

One aspect of the present invention provides displays. The display according to this aspect of the invention desirably includes a rear panel and an opaque spacer layer overlying the front surface of the rear panel, the spacer layer having a plurality of separate openings extending through it. Desirably, a mask layer desirably is disposed in front of the spacer layer, and a graphic layer bearing indicia overlies the mask layer. Light emitters such as light emitting diodes ("LEDs") are mounted to the rear panel. Each light emitter is disposed within one of the openings of the spacer layer. Most preferably, the mask layer is opaque except at light-transmissive areas disposed in registry with certain ones of the indicia on the graphic layer. Most preferably, each light transmissive area overlies an opening of the spacer layer having one of the light emitters disposed therein so that each light transmissive area is associated with one of the light emitters. An electrical circuit is arranged to selectively illuminate the light emitters so as to selectively illuminate indicia on the graphic layer. As further explained below, the mask layer controls the location where illumination appears on the graphic layer when each light emitter is energized. There is no need to precisely align the locations of the emitters with the indicia to be illuminated. For example, the emitters can be place at certain mounting locations of a regular grid pattern even though the indicia are located at irregular locations as, for example, the locations dictated by geographic locations of features on a map.

A further aspect of the invention provides methods of making a plurality of displays including a plurality of different graphic layers having indicia representing different sets of features. A method according to this aspect of the invention desirably includes using a plurality of identical circuit panels each having plural mounting locations to, providing a filled circuit panel for each graphic layer by mounting light emitters at selected mounting locations on each circuit panel so that different ones of the filled circuit panels have light emitters disposed at different mounting locations and the filled circuit panel for each graphic layer has light emitters mounted at those mounting locations disposed at locations most closely corresponding to locations of a set of selected features depicted on that graphic layer. The method also desirably includes providing a mask layer for each graphic layer, the mask layer being opaque except at light-transmissive areas corresponding to the set of selected features on the graphic layer. The method desirably further includes laminating each graphic layer with the mask layer for that graphic layer, the filled circuit panel for that graphic layer and a spacer layer having openings extending through the spacer layer so as to form the displays. The preferred processes according to this aspect of the invention can be used to create a wide variety of displays using simple, readily automated production processes, without the need for expensive customized circuit boards.

Further aspects of the invention provide systems including plural displays having their control circuits in communication with a central computer. As further explained below, the central computer may handle the tasks involved in translating information from a variety of sources to information pertaining to the illumination state of individual light emitters in each display. Because the control circuit in each display need not handle these tasks, the control circuit can be simple and economical, thus further reducing the cost of each display.

BRIEF DESCRIPTION OF THE DRAWINGS

FIG. 4 is a plan view depicting a display according to another embodiment.

FIG. 5 is a fragmentary plan view depicting a portion of the display shown in FIG. 4.

FIG. 6 is a view similar to FIG. 5 but depicting portions of another embodiment of the display.

DETAILED DESCRIPTION

A display 20 (FIG. 1) according to one embodiment includes a graphic layer 100 formed from a translucent medium as, for example, ordinary paper. In this instance, the graphic layer is an aviation sectional map, depicting features such as airports symbolized by small circular dots 102, (FIG. 2) as well as certain other features such as bodies of water 104. These features are laid out on the graphic layer at positions corresponding to their actual geographic locations. The graphic layer may be of any size, but typically covers a large area as, for example, about 600 mm (24 inches) by 450 mm (18 inches).

Figure 3:
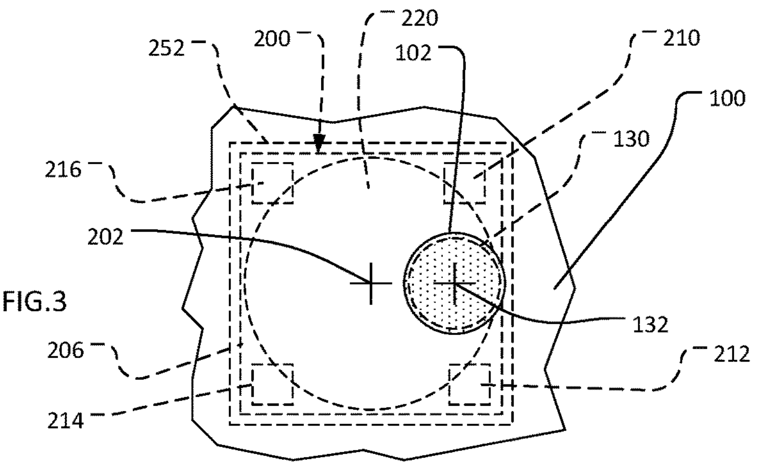
FIG. 3 is a fragmentary plan view depicting a portion of the display shown in FIGS. 1 and 2.

A mask layer 125 is disposed immediately behind graphic layer 100. Desirably, the mask layer is in contact with the graphic layer. The mask is opaque except at light-transmissive areas 130. The light-transmissive areas 130 of the mask are in registry with the indicia to be illuminated, in this case dots 102, so that each transmissive area 130 is aligned with one of the dots, as best seen in FIG. 3. Thus, the geometric center 132 of the transmissive area as seen in plan view in the plane of the graphic layer is aligned with the geometric center of the symbol 102. In this embodiment, the mask layer is formed as a sheet of an opaque material such as black paper, and each transmissive area 130 is constituted by a hole extending through this layer.

The display also includes a rear panel 22 having a front face 24 and a rear face 26. The rear panel has approximately the same dimensions in the plane of the front face as the graphic layer. As further discussed below, the rear panel in this embodiment is a printed circuit board defining numerous mounting locations in the form of sets of electrically conductive surface mount soldering pads 30,32,34 and 26 (FIG. 4), each such set being adapted to hold a light emitter. The mounting locations are disposed in a grid at regular intervals. For example, pads may be placed at center-to-center spacings of about 5 mm or so. The circuit board also includes traces 38 and 50 (FIG. 7) which interconnect the mounting pads with a control circuit 150 further discussed below.

Light emitters 200 are mounted at some of the mounting locations on the circuit board. As further discussed below, these locations are selected so that they will lie close to those indicia on the graphic layer which will be illuminated during use. In this embodiment, each light emitter 200 is a device commonly referred to as a multicolor serially addressable light emitting diode, further discussed below. Each emitter is adapted to emit light forwardly, away from circuit board 22, in a broad pattern centered on an optical axis 202 perpendicular to the circuit board, and to vary the color and brightness of the emitted light. Because the emitters 200 are mounted at the locations of the grid, the optical axes 202 of the emitters are disposed at locations on the grid. The light emitters are thin, typically about 4-5 mm or less.

A spacer layer 250 overlies the front surface 24 of the circuit board. The spacer layer is a sheet of material such as a plastic foam having a thickness just slightly greater than the thickness of the light emitters and having dimensions in the plane of the sheet corresponding to the dimensions of circuit board 22 and graphic layer 100. Spacer layer 250 has openings 252 extending through it at locations corresponding to the grid locations occupied by light emitters 200. Thus, each light emitter is disposed within one of the openings 252 in the spacer layer. Stated another way, each opening 252 in the spacer layer is associated with one of the light emitters 200, and each light emitter is arranged to emit light into the opening associated with that light emitter. The openings are separate from one another. Where two openings 252 are disposed adjacent one another, they are separated from one another by a wall 254 formed as part of the spacer layer. The spacer layer desirably is opaque so that it substantially prevents light propagation between adjacent openings.

The mask layer 125 overlies the front face 254 of the spacer layer, and most desirably the mask layer abuts the spacer layer, with at most a thin layer of adhesive (not shown) between these elements. The mask layer 125 and graphics layer 100 are disposed on the spacer layer so that each light transmissive area 130 on the mask layer overlies one of the openings 252 in the spacer layer which contains a light emitter 200. As discussed above, the symbols 102 on the graphics layer 100 are disposed at locations representing the locations of the features which they represent. Thus, at least some of the symbols 102 and the light-transmissive areas 130 of the mask layer are disposed at locations which do not lie at locations of the grid pattern where the optical axes 202 of the light emitters are disposed. Thus, for at least some of the openings, the symbol 102 and the corresponding light transmissive area 130 of the mask layer overlying the opening 252 will be offset from the optical axis 202 of the light emitter 200 disposed within that opening. Stated another way, the geometric center 132 is offset from the optical axis 202 of the light emitter in an offset direction in the plane of the graphic layer. The size of the offset, and the offset direction D will be different for different symbols overlying different openings.

In operation, the control circuit 150 actuates some or all of the light emitters to emit light. The light from the emitter disposed within each opening 252 propagates in a broad, diffuse pattern toward the mask layer 125, which blocks the light except at the light-transmissive area 130 overlying the opening. The light propagates through the symbol 102 which is in registry with the light-transmissive area, so that the symbol is illuminated. Stated another way, the light-transmissive area 130 overlying each opening 252 of spacer layer 250 is in optical communication with the particular light emitter 200 which emits light into that opening. As further explained below, the control circuit controls the emitters so that the light propagating through the various symbols represents information pertinent to the features represented by those symbols. In this example, symbols 102 represent airports, and the emitters controlled so that the illumination represents weather conditions prevailing at the various airports. Symbol 102*a* is illuminated with green light, indicating that the airport represented by that symbol is experiencing visual flight rules weather conditions. Symbol 102*b* is illuminated with red light, indicating that the airport represented by that symbol is experiencing instrument flight rules weather conditions.

The mask layer precisely controls the illumination. In the embodiment discussed above, the symbols 102 to be illuminated are circular, and the light-transmissive areas are also circular. However, the light-transmissive areas can be of any desired shape. A display 320 according to another example of the present disclosure (FIGS. 4 and 5) is similar to the display of FIGS. 1-3, except that the display of FIGS. 4 and 5 has a graphic layer 300 in the form of a road map with indicia including lines 302 depicting roads. Lines 302 are elongated indicia which include curved portions. As best seen in FIG. 5, different portions of a line 302 cross over plural openings 252 in the spacer layer which contain light emitters 200. The light-transmissive areas 330*a* and 330*b* are elongated in the lengthwise direction along the elongated indicia 302. Also, light-transmissive area 330*b* is curved to conform to the curvature of the elongated indicia. Because the light-transmissive areas on the mask layer can be precisely registered with the indicia on the graphic layer, the illumination can be placed precisely where it is wanted on the graphic layer. In this example, different portions of the same elongated line 302 are illuminated by different emitters. For example, emitter 200*a* can be illuminated in red to indicate stopped traffic on one part of the road depicted by line 300, whereas emitter 200*b* can be illuminated in yellow to indicate slow-moving traffic on the neighboring part of the road.

In a further variant (FIG. 6) the light transmissive area 331*a* overlying opening 252*a* includes a plurality of separate circular regions 332 aligned with the symbol to be illuminated. As these regions 332 are all illuminated by the same light emitter, they operate in unison. The light transmissive area 331*b* overlying opening 252*b* includes plural small rectangular regions 333. These regions are positioned on opposite sides of the symbol, at a small spacing from the symbol, so that when emitter 200*b* is illuminated, the illumination appears to surround the symbol. As used in this disclosure, a statement that a light-transmissive area of the mask is "in registry" with a symbol should be taken as including either placement of the light transmissive area in alignment with the symbol or placement of the light transmissive area in proximity to the symbol in a predetermined spatial relationship with the symbol. Other shapes and configurations of the light transmissive areas can be used.

Figure 1:
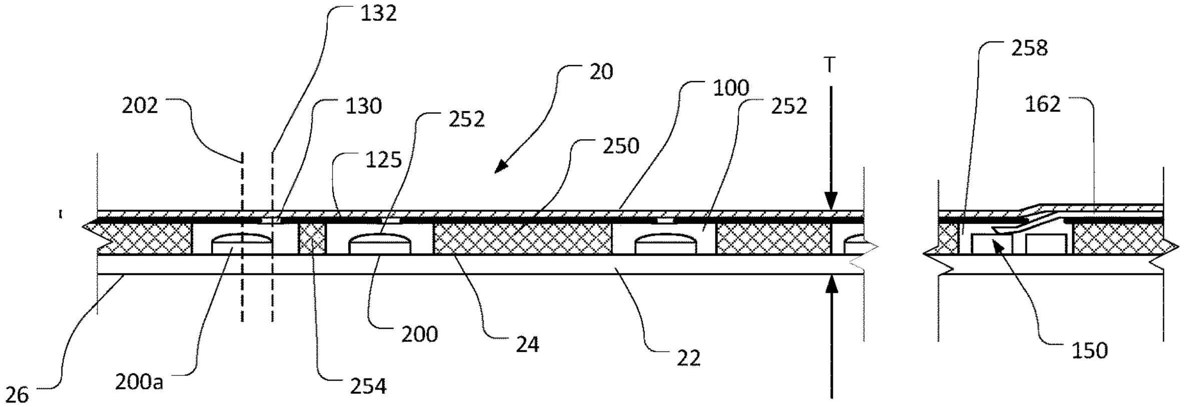
FIG. 1 is a fragmentary sectional view depicting portions of a display according to one embodiment.
Figure 2:
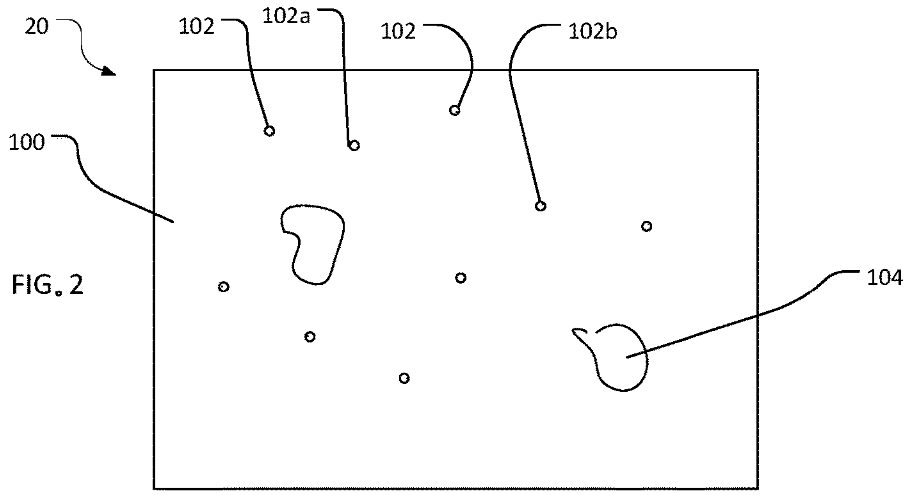
FIG. 2 is a plan view of the display depicted in FIG. 1.

The displays of FIGS. 4-6, and an infinite variety of other displays with different graphic layers and different indicia, can be made using the same printed circuit board, with the same grid of mounting locations, as used to make the display of FIGS. 1-3. This substantially reduces the cost of each display, and makes it practical to manufacture custom displays. Merely by way of example, the display may include other maps such as maps of skiing or surfing locations with illumination to indicate snow or wave conditions; transit system maps with illumination to indicate on-time performance, locations of transit vehicles or the like, and maps of an industrial plant showing the locations of different machines and illumination to indicate the operational status of these machines. As used in this disclosure, the term "map" refers to a graphic layer with indicia placed at locations corresponding to the locations in space of the features represented by the indicia. The graphic layer need not be a map. For example, it may be a process flow diagram with indicia representing features in the form of steps in processes, and these indicia may be placed to depict the sequence of steps in the process; the indicia may be illuminated to indicate conditions relevant to each step in the process. In a further example, the indicia may include the text of a law and the illumination may be synchronized with playback of a recorded explanation of the law so that the text pertinent to a particular point being made in the explanation is illuminated while that point is playing.

The displays discussed above are in the form of thin panels; the entire thickness T of the display, from the rear surface 26 of the rear panel to the front surface of graphic layer 100, desirably is about 6-7 mm (about ¼ inch) or less. When mounted on a wall with or without a surrounding picture frame, the display appears to be a picture. Moreover, when emitters are turned off, the components behind the graphic layer are not visible, so that the graphic layer has its original aesthetic appeal.

In the embodiments discussed above, the illumination of each emitter can be controlled to vary the color of the illumination. However, this is not essential. For example, the emitters can be monochromatic and simply off or on, so that the presence of illumination at a particular symbol on the graphic layer indicates one condition and absence of illumination indicates another condition. In a variant of this approach, monochromatic or controllable color emitters can flash to convey still another state.

A portion of the rear panel 22 used in the embodiments discussed above is depicted in FIGS. 7 and 8. The panel is a single-sided circuit panel having a front face 24 and a rear face 26. The circuit panel includes an electrically conductive ground layer 25 at the rear face of the panel, an electrically conductive power layer 27 and a dielectric layer 28 between the ground and power layers. A further dielectric layer 29 overlies the power layer 27. Electrically conductive pads 30,32,34 and 36 and electrically conductive traces 38 overlie dielectric layer 30 at the front surface 24 of the panel.

Pads 30 are referred to herein as "power" pads; each power pad is electrically connected to the power layer 27 by a "via" or connector (not shown) extending through dielectric layer 29 to power layer 27. Pads 34 are referred to herein as "ground" pads. Each ground pad 34 is connected to ground layer 26 by a via (not shown) extending though dielectric layers 28 and 29 and through holes (not shown) in power layer 20 and insulated from the power layer. Via connections of this type are widely used in commercial circuit board construction. Pads 32 are referred to as "data in" pads, whereas pads 36 are referred to herein as "data out" pads. The data in and data out pads are not connected to the power and ground planes.

Figure 7:
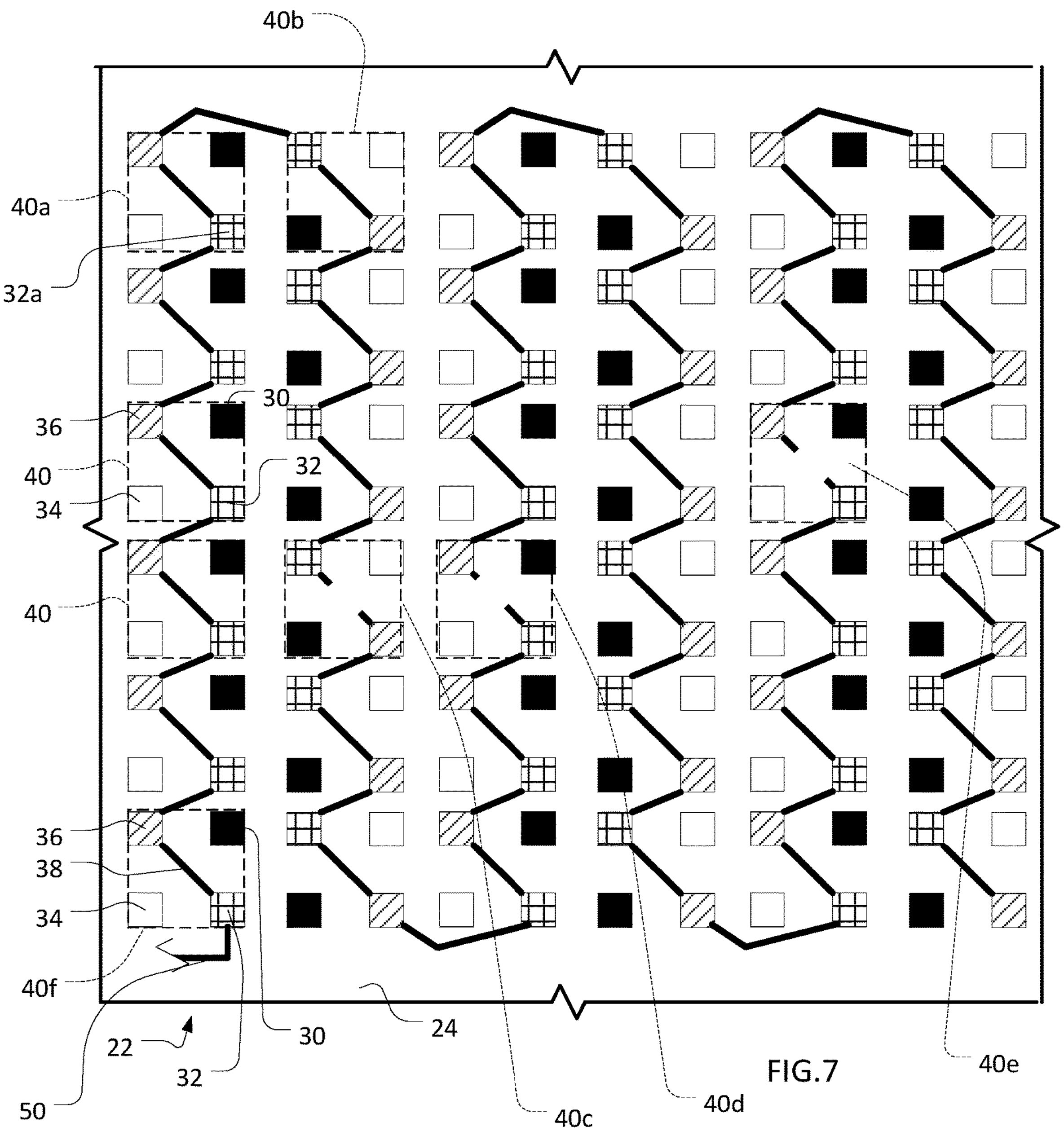
FIG. 7 is a fragmentary plan view of a circuit panel used in the displays of FIGS. 1-6.
Figure 8:
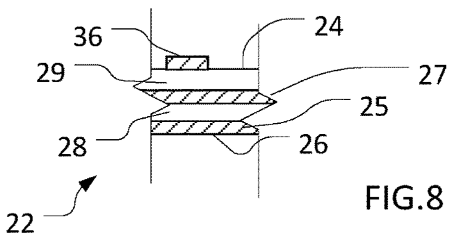
FIG. 8 is a fragmentary sectional view of the circuit panel shown in FIG. 7.

Pads 30-36 are arranged in sets 40, each such set including a data in pad 32, a data out pad 36, a power pad 30 and a ground pad 34. The pads of each set 40 are arranged in a square, with one pad at each corner of the square. The sets 40 are arranged in a regular array with columns extending vertically as seen in FIG. 7 and with rows extending horizontally. There are even spaces between columns and between rows. Within each column, the sets are oriented in the same way. However, the orientation of the sets is rotated 180 degrees in alternating columns. For example, set 40*a* in the left-most column has data-in pad at the lower right corner, and all of the other pads in the same column have the same orientation. Set 40*b* at the top of the second column from left has its data-in pad at the upper left corner of the set, and all of the other sets in this column have the same orientation.

A common data trace 38 extends from the data-in pad 32 of each set to the data out pad 36 of the same set, and from the data out pad of each set to the data-in pad of the next set, so that all of the data-in pads and data-out pads are connected in series with one another by the common data trace, except that the common data trace is interrupted between the data-in and data-out pads of each set where a light emitter is to be mounted. Such interruptions are shown at sets 40*c*, 40*d* and 40*e* in FIG. 7. As further explained below, this arrangement can be formed with interruptions at desired sets of pads by providing unprocessed circuit panels with complete traces at every set and severing the trace between the data-in and data-out pads only in those sets of pads where the light emitters are to be mounted. An input trace 50 (FIG. 7) extends from the data-in pad 32 of set 40*f*.

The portion of the circuit panel depicted in FIG. 7 defines one group of 36 mounting locations addressable through input trace 50. Other portions of the circuit board include other groups identical to the group depicted in FIG. 7, and each group of mounting locations has a separate input trace. These groups of mounting locations occupy the vast majority of the circuit panel front surface. The input traces extend to a small area of the circuit panel where the control circuit 150 (FIG. 1) is to be mounted.

As discussed above, the light emitters used in the embodiments discussed above are serially-addressable, multicolor light emitting diodes. As best seen in FIG. 3, each emitter 200 includes a square, flat housing 206 having four surface mounting pads on its rear surface. The pads include a power pad 210, data in pad 212, ground pad 214 and data out pad 216. A circular lens 220 is provided on the front surface of housing 206. The housing contains three individual diodes, each arranged to emit light in a different color (red, green and blue) and circuitry (not shown) for actuating each of the three individual diodes. The housing also contains a rudimentary logic circuit arranged to receive commands through the data in pad 212 and propagate the command through the data out pad 216. Each command includes an address value and illumination values for each of the three individual diodes. If the address value is "1", the logic circuit instructs the actuation circuitry to illuminate the diodes according to the illumination values. If the address value is a number greater than "1", the logic circuit ignores the illumination values but modifies the command by deducting 1 from the address value and propagates the command through data out pad 216. Serially addressable multicolor light emitting diodes of this type are widely available and inexpensive; they are used in vast numbers in decorative products such as mood lighting strips.

In a further stage of the manufacturing process, the emitters are mounted only at the locations where the common data traces have been severed. In the group of locations depicted in FIG. 7, these are locations 40*c*, 40*d* and 40*e*. The emitters mounted in these positions are connected in series with one another with the emitters at location 40*c* directly connected to the input trace 50; the emitter at position 40*d* being connected to the input trace 50 through the emitter at position 40, and the emitter at position 40*e* connected to the input trace through the emitters at positions 40*c* and 40*d*. A command with an address of "2" sent by the logic circuit along input trace 50 will pass through the emitter at location 40*c*. The logic circuit of that emitter will not vary the illumination of that emitter, but will subtract 1 from the address and forward the command to the emitter at location 40*d*. The logic circuit of that emitter will recognize the command as addressed to it and vary the illumination emitted by that emitter. Stated another way, each emitter has an ordinal position in the series circuit of a particular group of emitters. A command can be addressed to a particular emitter in a particular group by sending the command on the input line 50 connected to that group with an address corresponding to the ordinal position of the particular emitter.

Figure 9:
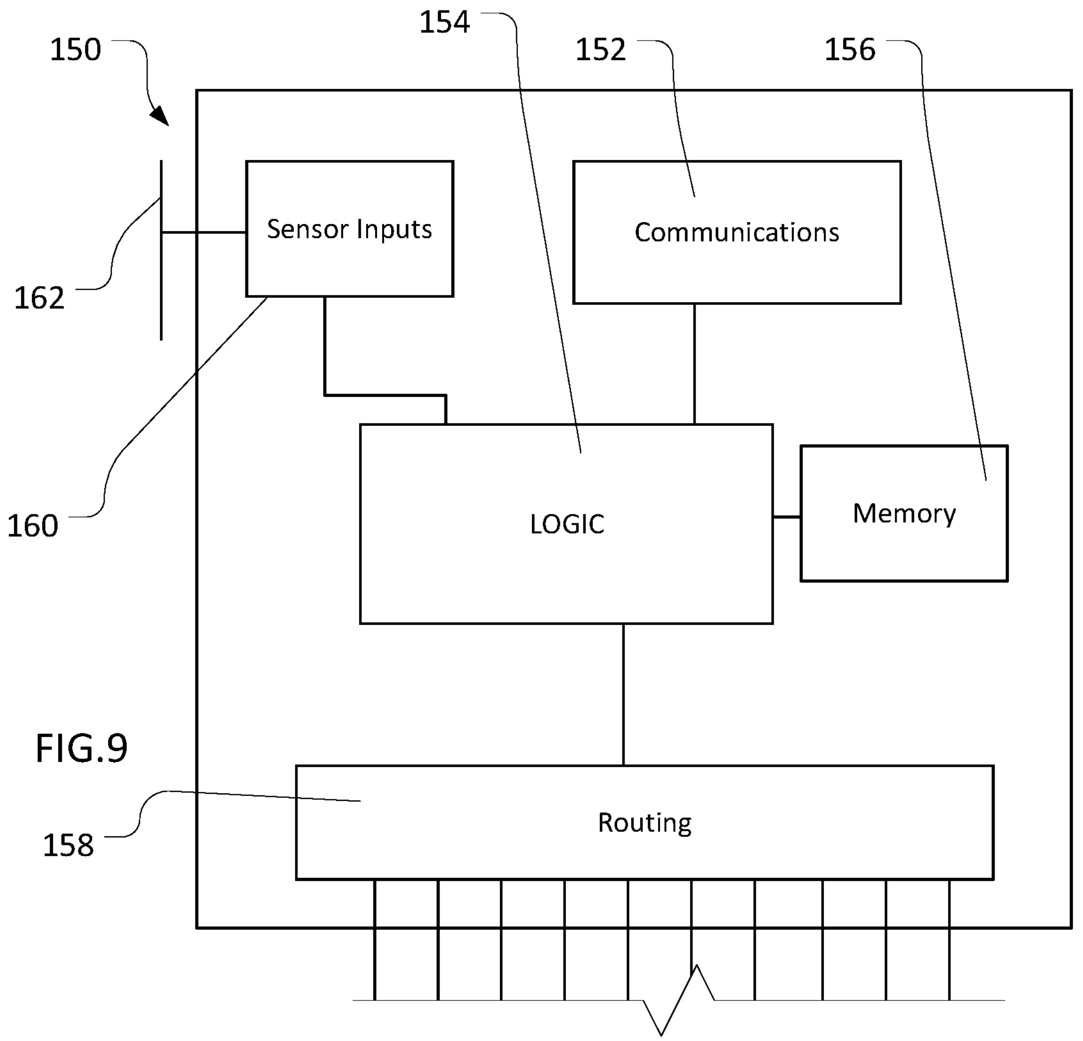
FIG. 9 is a functional block diagram depicting certain elements pf the displays of FIGS. 1-6.

The control circuit 150 (FIG. 1) is depicted in functional block form in FIG. 9. The circuit includes a communications module 152 as, for example Bluetooth and Wi-Fi communications elements; a logic circuit 154 capable of carrying out the operations discussed below and a memory 156 capable of storing and retrieving data and instructions. The control circuit further includes a routing circuit connected to the data lines 50 associated with the various groups of mounting locations 40. The control circuit optionally includes a sensor interface 160 operative to detect signals from one or more sensors incorporated in the display and provide such signals in a form intelligible by logic circuit 154. In this embodiment, a capacitive sensor 162 is provided. Sensor 162 is in the form of a metal foil strip (FIG. 1) disposed in front of the spacer layer 250 as, for example, between the mask layer 125 and the graphic layer or between the mask layer 125 and the graphic layer 100. The sensor interface detects a change in capacitance between the foil strip and the surroundings caused by a human hand swiping across the front graphic layer and issues a logic-level signal to logic circuit 154. In this embodiment, the logic circuit is arranged to turn power to the emitters off or on in response to the signal from the capacitive sensor. The control circuit can be formed in one or more semiconductor chips. These chips are disposed in an opening 258 in the spacer layer. Typically, the logic circuit and sensors are disposed in an area near an edge of the circuit panel reserved for such use, and the graphic layer does not include indicia requiring illumination in this area.

The manufacturing process for the display as discussed above can be summarized as follows. The process starts with a set of identical circuit panels as discussed above. Data defining the features to be depicted on the graphic layer includes data identifying each feature and the location of each feature in a two-dimensional coordinate system corresponding to the size of the display, and used to print the graphic layer with symbols corresponding to the features at the specified locations on a sheet such as a paper sheet. Symbols which are to be illuminated are selected either manually or automatically, based on the identification of the various features. For example, in making an aviation display, airport symbols may be automatically selected for illumination. The mask layer is formed using the same coordinates for the selected symbols as, for example, by forming holes in an opaque sheet using an automated punch, laser cutter or the like. In a variant, the mask layer may be formed by depositing a coating of opaque material on the rear surface of the sheet constituting the graphic layer as, for example, by ink jet printing so as to leave holes in the mask layer. In such an arrangement, the mask layer is laminated with the graphic layer at the same time that the mask layer is formed.

The coordinates for the selected symbols are used to select mounting locations on the circuit panel where emitters are to be mounted. The mounting location nearest to the coordinates of each selected symbol is associated with that symbol and with the feature represented by that symbol. After the mounting locations have been identified, the mounting locations can be recorded in a table or other data structure which represents the mounting location by the group to which the mounting location belongs and the ordinal number of the emitter which will be mounted at that mounting location within the group. In the example discussed above with reference to FIG. 7, the emitters mounted at locations 40*c*, 40*d* and 40*e* will have ordinal numbers 1,2 and 3 within the group of mounting locations depicted in FIG. 7. This yields a table associating each feature depicted by an illuminated symbol with a specific group number and ordinal number. This table, referred to herein as the "association table" for the individual display, is saved along with a serial number assigned to the individual display by the manufacturer and an indication of the data source for conditions prevailing at the various features depicted by the display. For example, in the aviation display of FIGS. 1-3, the table may have the format shown below:

| Display Serial Number 12001<br>Data Source: Aviation Weather | | |
|---|---|---|
| Airport (3 letter IATA code) | Group No. | Ordinal |
| HPN | 1 | 1 |
| POU | 1 | 2 |
| MMT | 1 | 3 |
| TEB | 2 | 1 |
| EWR | 2 | 2 |
| *** | *** | *** |

The manufacturer saves the association table for use in operation of the display as discussed below. The manufacturer also saves a translation table relating conditions at a feature to illumination of the emitter associated with that feature. In the case of an aviation map display, this table may specify red for instrument flight condition, green for visual flight conditions and purple for a closed airport. For a highway traffic display, this table may specify different illumination colors for different traffic speeds. The translation table may be identical for many displays depicting the same types of features as, for example, for all aviation map displays, or may be customized to an individual display identified by the serial number of the display.

After selection of the mounting locations, the common data trace is severed at each selected mounting location as discussed above. This process can be performed automatically, using relatively simple equipment such as a numerically controlled milling machine or laser ablation device. The emitters and control circuit components are then mounted to the circuit panel using conventional surface mounting techniques.

The data specifying the mounting locations to receive the emitters also specifies these locations in the two-dimensional coordinate system of the display. The openings 252 in spacer layer 250 are formed by cutting the material of the layer using an automated cutting device such as a laser cutter, or water jet cutter, or by momentarily applying a high voltage between the data-in and data-out pads of each set where the trace is to be severed. The graphic layer, mask layer, spacer layer and circuit panel are laminated to form the finished display. In the lamination process, the mask layer should be precisely aligned with the graphic layer as, for example, by registering fiducial marks (not shown) on these layers with one another.

Figure 10:
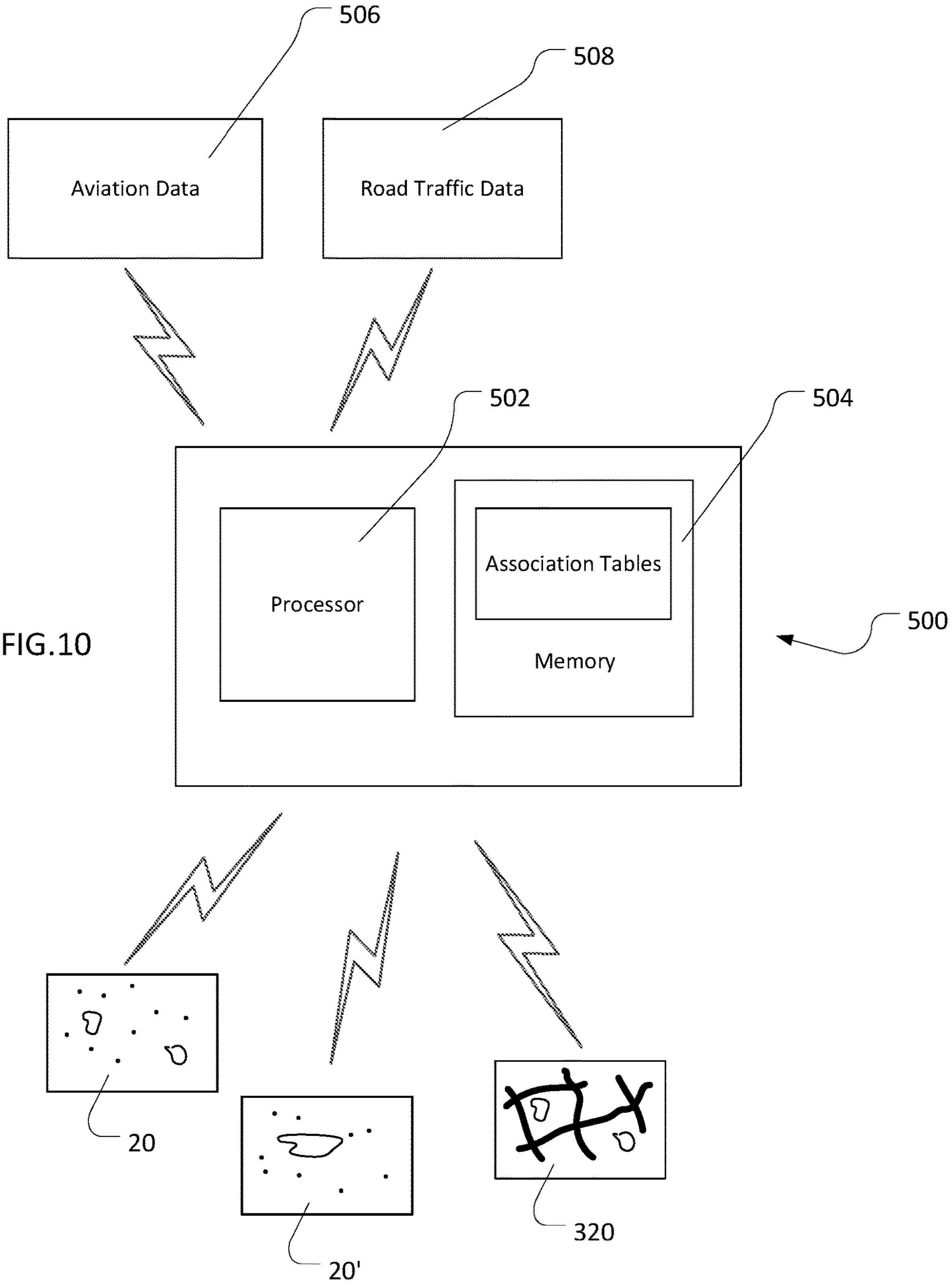
FIG. 10 is a diagrammatic view of a system incorporating the displays of FIGS. 1-6.

The displays discussed above are operated in association with an external computer. As depicted in FIG. 10, the external computer may be a central computer 500 (FIG. 10), which includes conventional elements such as a processor 502 and a memory 504 which contains instructions, as well as conventional communication elements (not shown) for establishing communication over a network, typically the Internet. The memory also holds the association tables for numerous displays 20*a*, 20*b*, 20*c* and 20*b*. The manufacturer of the display may load the association table for each display when the display is manufactured. The central computer receives information from private servers or public sources such as aviation weather databases 506, highway traffic databases 508 and the like.

When the user first actuates one of the displays, the logic circuit 154 of the display (FIG. 9) executes a startup regime. First, it instructs the communication circuit 152 to establish communication with a local device accessible to the user as, for example, the user's cell phone, typically by a Bluetooth link, and requests that the user enter data about available Internet communications as, for example the SSID and password for an available local Wi-Fi network connected to the Internet. The logic circuit then establishes a communication link with the central computer 500 and sends the serial number assigned by the manufacturer to the central computer.

The central computer finds the association table for the display having the serial number, checks the information from the data source specified in the association table, and selects information about conditions prevailing at the features listed in the association table. For each feature listed in the association table for the display, the central computer uses the translation table associated with the display to determine an appropriate emission state for the light emitter associated with the feature based on conditions prevailing at that feature. The central computer sends information specifying an illumination state for each individual emitter in the display. For example, the central computer may send information in the form of the group number and ordinal number of a particular emitter together with information specifying the illumination state of that emitter. The logic circuit 154 of the display stores the illumination state for each emitter in memory 156 and issues commands to the individual emitters through the routing circuit 158. The central computer will repeatedly update the information for each display. This may be done in response to changes in the information received from the sources 506, 508 or periodically. When a user of the display turns the display on, the logic circuit 154 of the display will request updated information.

Because the tasks required to translate information from the data sources into illumination states of individual light emitters are handled by the central computer which is external to the display, the logic circuit in the display may be simple, compact and inexpensive. For example the logic circuit and other elements of the control system may be in an ESP32 System on chip or "SOC". The use of a common addressing scheme for the emitters in different displays facilitates operation of a central computer serving many displays. For example, as shown in FIG. 10 the central computer is serving aviation map display 20 discussed above; a different aviation map display 20' depicting a different set of airports; and the highway traffic display 320 discussed above. In practice, the central computer may serve a large number of displays.

Some of the displays will use information which is not available from public sources. The startup routine for those displays may allow the user to specify an external computer (not shown) operated by the user as, for example, by specifying an IP address for that computer. The external computer uses the association table and translation table for the display in the same manner as discussed above.

The elements and features discussed above may be varied in many ways. For example, the sensor 162 and sensor input circuit 164 may be omitted. In this case, the emitters will be illuminated at all times while power is supplied to the display. The display may include other types of sensors. For example, the display may include a photocell operative to detect ambient light, and the logic circuit may be arranged to vary the brightness of the illumination from the emitters in response to changes in ambient light. The emitters need not be serially-addressable devices; other addressing schemes may be used. Use of an external computer as discussed above is not essential. The control circuit may be arranged to collect information from external sources. In some cases, the control circuit may be arranged to control the illumination in response to user inputs rather than in response to conditions prevailing at the features depicted on the display. Also, light emitters other than LEDs can be employed. The light emitters need not be surface mounted to the circuit panel.

Figure 11:
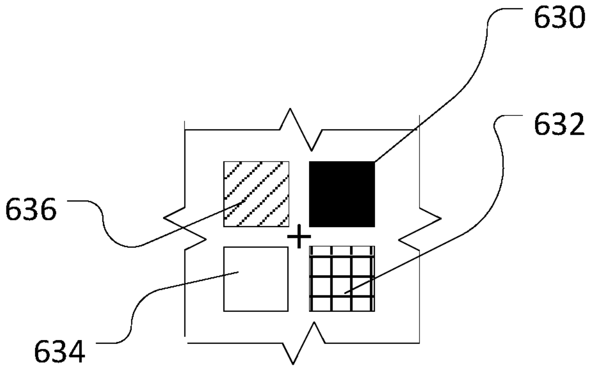
FIGS. 11 and 12 are fragmentary plan views of a circuit panel used in another embodiment.
Figure 12:
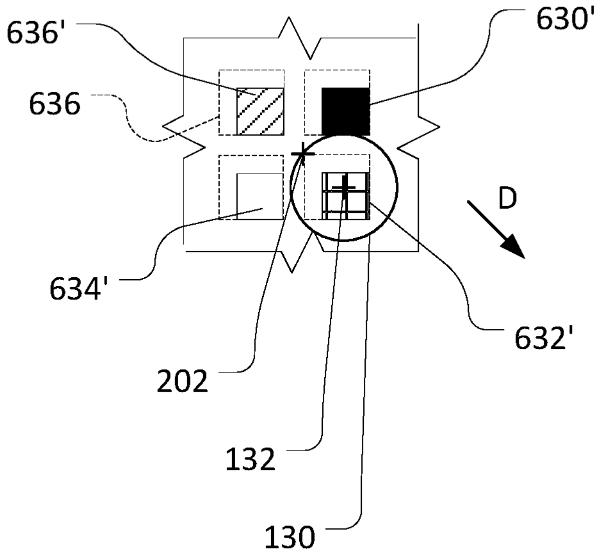

In a further variant, the circuit panel 622 (FIG. 11) includes mounting pads 630,630,632,636 which are larger than the pads on the emitter. The circuit panel has a solder barrier layer 601 (FIG. 12) covering the mounting pads. The display manufacturing process includes patterning the solder barrier layer 601 to leave areas 630', 632', 633' and 636' of the pads exposed. The exposed areas are the same size as the pads on the emitter. As depicted in FIG. 12, the exposed areas can be offset from the pads in an offset direction D. For example, the center of exposed area 636' is offset from the center of pad 636. The offset direction is the same for all of the pads in a given set of pads constituting a mounting location. When a light emitter is mounted to the panel, the optical axis of the emitter will be centered at the center of the set of exposed areas. The offset distance, if any, and the offset direction D are selected individually for each set of mounting pads so that the offset direction is the direction toward the center 132 of light transmissive area which will be associated with the emitter. The patterning process can be performed by conventional photographic patterning techniques.

As these and other variations and combinations of the features discussed above can be used, the foregoing description should be taken as illustrating, rather than as limiting, the scope of the present invention.

The invention claimed is:

1. A display including:

(a) a rear panel having a front surface;

(b) an opaque spacer layer overlying the front surface of the rear panel, the spacer layer having a plurality of separate openings extending through it;

(c) a mask layer overlying the spacer layer;

(d) a light-transmissive graphic layer disposed in front of the mask layer, the graphic layer having indicia thereon;

(e) a plurality of light emitters mounted to the rear panel, each light emitter being disposed within one of the openings of the spacer layer, the mask layer being opaque except at light-transmissive areas disposed in registry with certain ones of the indicia on the graphic layer, each light transmissive area overlying an opening of the spacer layer having one of the light emitters disposed therein so that each light transmissive area is associated with one of the light emitters; and (f) an electrical circuit arranged to selectively illuminate the light emitters so as to selectively illuminate the certain ones of the indicia on the graphic layer without illuminating other portions of the graphic layer that do not include the selectively illuminated indicia.

2. A display as claimed in claim 1 wherein the light-transmissive areas of the mask layer are constituted by holes extending through the mask layer.

3. A display as claimed in claim 1 wherein at least some of the indicia on the graphic layer are elongated and at least one of the light-transmissive areas on the mask layer is an elongated area in registry with an elongated indicia on the graphic layer.

4. A display as claimed in claim 1 wherein the graphic layer is translucent.

5. A display as claimed in claim 1 wherein the rear panel, spacer layer, mask layer and graphic layer are bonded to one another.

6. A display as claimed in claim 1 wherein the indicia on the graphic layer depict different features and the electrical circuit includes a communication circuit operative to receive information pertaining to the features and selectively illuminate the light emitters responsive to the information so as to portray information pertaining to each feature by illuminating that feature.

7. A display as claimed in claim 6 wherein the communication circuit is operative to send information identifying the display.

8. A system including a plurality of displays as claimed in claim 7, the indicia on the graphic layers of different ones of the displays depicting different sets of features and a central computer operative to:

(a) store information identifying the features depicted by each one of the displays;

(b) receive information representing conditions at the features depicted by the indicia of all of the displays;

(c) receive information from each display identifying that display; and (d) send information to each display representing conditions pertaining to the features depicted by that display.

9. A system as claimed in claim 8 wherein the central computer is operative to store, for each one of the displays, information correlating each light emitter of the display with a particular feature depicted by that display, and to send the information representing conditions to each one of the displays in the form of information pertaining to particular ones of the light emitters of that display.

10. A display as claimed in claim 1 wherein each of the light emitters has an optical axis and is operative to emit light in a pattern centered on the optical axis of the emitter, and wherein, for at least some of the openings in the spacer layer, the geometric center of the light-transmissive area overlying the opening is offset from the optical axis of the light emitter disposed within the opening.

11. A display as claimed in claim 10 wherein the light emitters are surface-mountable LEDs, the rear panel is a circuit panel having conductive traces and surface mounting pads disposed in sets, each set being adapted for mounting of one LED, and the LEDs are mounted at only some of the sets of pads, and wherein the electrical circuit includes the traces and pads of the circuit panel.

12. A display as claimed in claim 11 wherein the LEDs are multicolor LEDs.

13. A display as claimed in claim 11 wherein the circuit panel includes a solder barrier layer overlying the pads and having openings defining exposed areas of the pads for surface mounting, the exposed areas being smaller than the pads and wherein, for at least one set where an LED is mounted, the exposed areas of the pads are offset from the centers of the pads in a common offset direction toward the light-transmissive area overlying the opening containing the LED.

14. A display as claimed in claim 11 wherein the sets of pads are disposed in a grid with sets spaced apart from one another uniformly.

15. A display as claimed in claim 14 wherein the LEDs are serially-addressable LEDs and each pad set of the circuit panel includes a data-in pad and a data-out pad, the data-in and data-out pads of a plurality of sets being connected in series with one another on a common data trace, the common data trace being interrupted at each set where an LED is mounted.

16. A method of making a plurality of displays including a plurality of different graphic layers having indicia depicting different sets of features, the method comprising:

(a) using a plurality of identical circuit panels each having a filled circuit panel for each graphic layer by surface-mounting at selected ones of the mounting locations on each circuit panel so that different ones of the filled circuit panels have light emitters disposed at different mounting locations and the filled circuit panel for each graphic layer has light emitters mounted at those mounting locations disposed at locations most closely corresponding to locations of a set of selected features depicted on that graphic layer;

(b) for each graphic layer, providing a mask layer which is opaque except at light-transmissive areas, the light-transmissive areas of the mask layer corresponding to the set of selected features on the graphic layer; and (c) laminating each graphic layer with the mask layer for that graphic layer, the filled circuit panel for that graphic layer and a spacer layer having openings extending through the spacer layer so as to form the displays, the laminating step being performed so that in each display:

(i) a spacer layer overlies the circuit panel and each light emitter mounted to the circuit panel is disposed within an opening of the spacer layer overlying the panel;

(ii) a mask layer overlies the spacer layer and each light-transmissive area of the mask layer overlies an opening of the spacer layer having an light emitter disposed therein; and (iii) the light-transmissive areas of the mask layer are in registry with the selected features of the graphic layer.

17. A method as claimed in claim 16 wherein each of the light emitters has an optical axis and is operative to emit light in a pattern centered on the optical axis of the light emitter, the laminating step places at least some of the light-transmissive areas of the mask layers so that, the geometric center of a light-transmissive area overlying an opening is offset from the optical axis of the light emitter disposed within that opening.

18. A method as claimed in claim 16 wherein each of the identical circuit panels has a set of mounting pads at each mounting location, further comprising the step of patterning a solder barrier layer on each circuit panel so that, at each selected mounting location, the solder barrier layer covers portions of each pad of but leaves exposed areas of the pads, and at least one selected mounting location on at least one of the circuit panels, the exposed areas of the pads are offset from the geometric centers of the pads so that the locations of the exposed areas of the selected sets of pads correspond more closely to the locations of the selected features on the graphic layer.

19. A method as claimed in claim 16 wherein each of the identical circuit panels has a set of mounting pads including a data-in pad and a data-out pad at each mounting location and serial data traces, each serial data trace extending through the data-in pad and data-out pads of a plurality of sets, the method further comprising severing the serial data traces between the data-in pad and data-out pad of each set where an emitter is to be mounted.

* * * * *